United States Patent
DeMers et al.

(10) Patent No.: US 8,995,678 B2
(45) Date of Patent: Mar. 31, 2015

(54) TACTILE-BASED GUIDANCE SYSTEM

(75) Inventors: Robert E. DeMers, Nowthen, MN (US); Tom Plocher, Hugo, MN (US); Steve Huseth, Plymouth, MN (US)

(73) Assignee: Honeywell International Inc., Morristown, NJ (US)

( * ) Notice: Subject to any disclaimer, the term of this patent is extended or adjusted under 35 U.S.C. 154(b) by 885 days.

(21) Appl. No.: 12/771,252

(22) Filed: Apr. 30, 2010

(65) Prior Publication Data

US 2011/0268300 A1   Nov. 3, 2011

(51) Int. Cl.
| | |
|---|---|
| H04R 1/10 | (2006.01) |
| H04R 5/02 | (2006.01) |
| G08B 6/00 | (2006.01) |
| H04R 5/04 | (2006.01) |

(52) U.S. Cl.
CPC ... *H04R 5/04* (2013.01); *H04R 5/02* (2013.01)
USPC ............. 381/74; 381/309; 381/151; 381/311; 340/407.1

(58) Field of Classification Search
CPC ........ G08B 6/00; G06F 3/016; G09B 21/003; G09B 21/006; G09B 21/007; H04M 19/04; H04M 19/047; H04R 1/1041; H04R 1/1016; H04R 5/033; H04R 5/0335; H04R 5/04; H04S 2400/01; H04S 2420/01; H04S 2420/07; H04S 1/005
USPC ................. 381/92, 301, 303–307, 56–57, 87, 381/332–336, 151, 309–311; 340/4.1, 4.11, 340/4.12, 4.13, 4.14, 965, 407.1
See application file for complete search history.

(56) References Cited

U.S. PATENT DOCUMENTS

| | | | |
|---|---|---|---|
| 4,713,651 A * | 12/1987 | Morag ........................ 340/407.1 |
| 5,719,561 A | 2/1998 | Gonzales | |
| 5,857,986 A | 1/1999 | Moriyasu | |
| 6,198,395 B1 * | 3/2001 | Sussman .................... 340/573.1 |
| 6,710,706 B1 | 3/2004 | Withington et al. | |
| 6,924,787 B2 | 8/2005 | Kramer et al. | |
| 6,965,312 B2 | 11/2005 | Lerg | |
| 7,132,928 B2 | 11/2006 | Perricone | |
| 7,146,218 B2 | 12/2006 | Esteller et al. | |

(Continued)

FOREIGN PATENT DOCUMENTS

| | | |
|---|---|---|
| GB | 2441434 | 5/2008 |
| WO | WO 92/10953 | 7/1992 |

(Continued)

OTHER PUBLICATIONS

U.S. Appl. No. 12/573,398, filed Oct. 5, 2009.

(Continued)

*Primary Examiner* — Xu Mei
(74) *Attorney, Agent, or Firm* — Seager Tufte & Wickhem LLC.

(57) ABSTRACT

A tactile-based guidance system incorporating tactors in headgear, such as a hat, helmet, or hood. Tactors may provide tactile sensations at different places about the head to convey information to a person such as direction, bearing, movement, orientation, and the like, of the person wearing the tactors. The system may also include an optional multi-dimensional sound mechanism which provides indications of direction, bearing, and other information. One or more tactors may be resorted to for resolving any ambiguity in the sound indications.

18 Claims, 5 Drawing Sheets

(56) References Cited

U.S. PATENT DOCUMENTS

| | | |
|---|---|---|
| 7,301,648 B2 | 11/2007 | Foxlin |
| 7,304,442 B2 | 12/2007 | Colwell |
| 7,358,458 B2 | 4/2008 | Daniel |
| 7,408,465 B2 * | 8/2008 | Boss et al. ............... 340/572.1 |
| 7,420,510 B2 | 9/2008 | Kolavennu et al. |
| 7,545,263 B2 | 6/2009 | Plocher et al. |
| 7,612,832 B2 | 11/2009 | Zhang et al. |
| 7,683,793 B2 | 3/2010 | Li et al. |
| 7,774,075 B2 | 8/2010 | Lin |
| 2002/0055384 A1 | 5/2002 | Armstrong |
| 2005/0264558 A1 | 12/2005 | Vesely et al. |
| 2006/0061752 A1 | 3/2006 | Solomon et al. |
| 2006/0073455 A1 | 4/2006 | Buyl et al. |
| 2007/0201421 A1 | 8/2007 | Huseth |
| 2007/0279210 A1 | 12/2007 | Li et al. |
| 2009/0040175 A1 | 2/2009 | Xu et al. |
| 2009/0044808 A1 | 2/2009 | Guney et al. |
| 2009/0046140 A1 | 2/2009 | Lashmet et al. |
| 2009/0105006 A1 | 4/2009 | Doyle |
| 2009/0192707 A1 * | 7/2009 | Nakatsuka et al. ............ 701/211 |
| 2009/0298024 A1 | 12/2009 | Batzler et al. |
| 2010/0057354 A1 | 3/2010 | Chen et al. |
| 2010/0079263 A1 * | 4/2010 | Anabuki et al. ............. 340/407.1 |

FOREIGN PATENT DOCUMENTS

| | | |
|---|---|---|
| WO | WO 2005/040989 | 5/2005 |
| WO | WO 2009/029834 | 3/2009 |
| WO | WO 2009/071919 | 6/2009 |

OTHER PUBLICATIONS

U.S. Appl. No. 12/772,310, filed May 3, 2010.
U.S. Appl. No. 12/773,688, filed May 4, 2010.
U.S. Appl. No. 12/783,770, filed May 20, 2010.
Engineering Acoustics, Inc., "Tactor Interface/Controller Advanced Evaluation Board Eval.2.0," 2 pages, prior to Apr. 30, 2010.
Walker et al., "Development and Evaluation of a System for Wearable Audio Navigation," Proceedings of the Human Factors and Ergonomics Society 49th Annual Meeting, pp. 1607-1609, 2005.

* cited by examiner

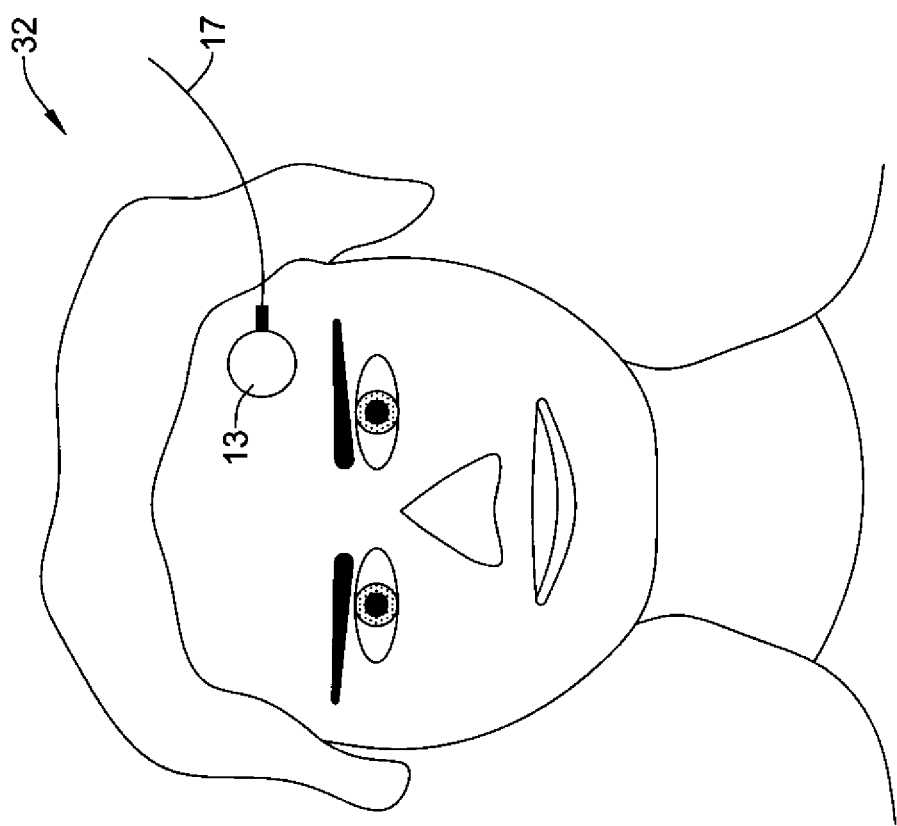

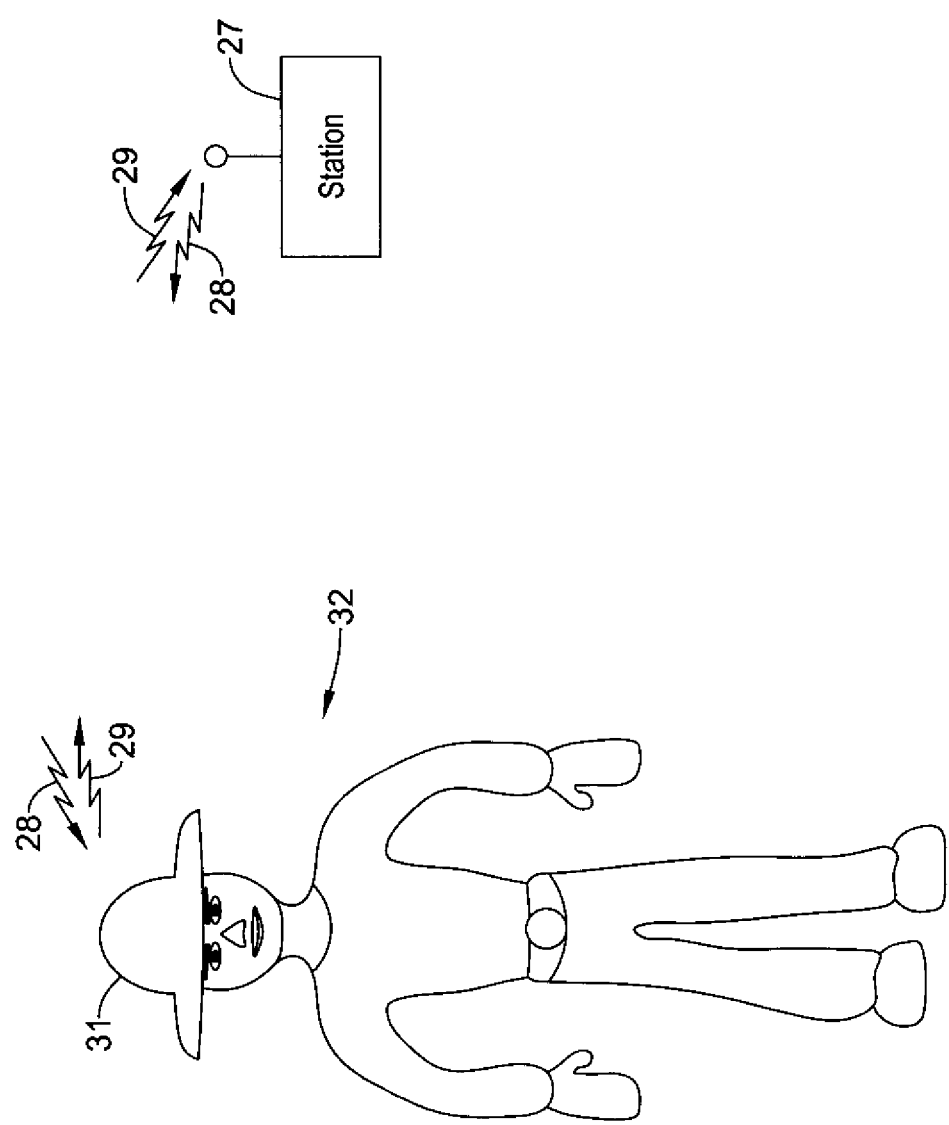

TACTILE-BASED GUIDANCE SYSTEM

BACKGROUND

The invention pertains to guidance systems and particularly to sensor based guidance systems. More particularly, the invention pertains to multi-sensor based guidance systems.

SUMMARY

The invention is a tactile-based guidance system. The system may incorporate tactors in head-gear, such as a hat, helmet, protective hood, or the like. Tactors may provide tactile sensations at different places about the head to convey information to a person such as direction, bearing, movement, orientation, targets, routes, destinations, and other information. The system may also include an optional multi-dimensional sound mechanism which provides indications of direction, bearing, movement, orientation, targets, routes, destinations, and other information. One or more tactors may be resorted to for resolving any ambiguity in the sound indications.

BRIEF DESCRIPTION OF THE DRAWING

FIG. 4 is an example placement of a tactor on a person's head; and

FIG. 5 is a diagram of a person having a hat-based tactile guidance system capable of communicating with a remote station.

DESCRIPTION

Figure 1:
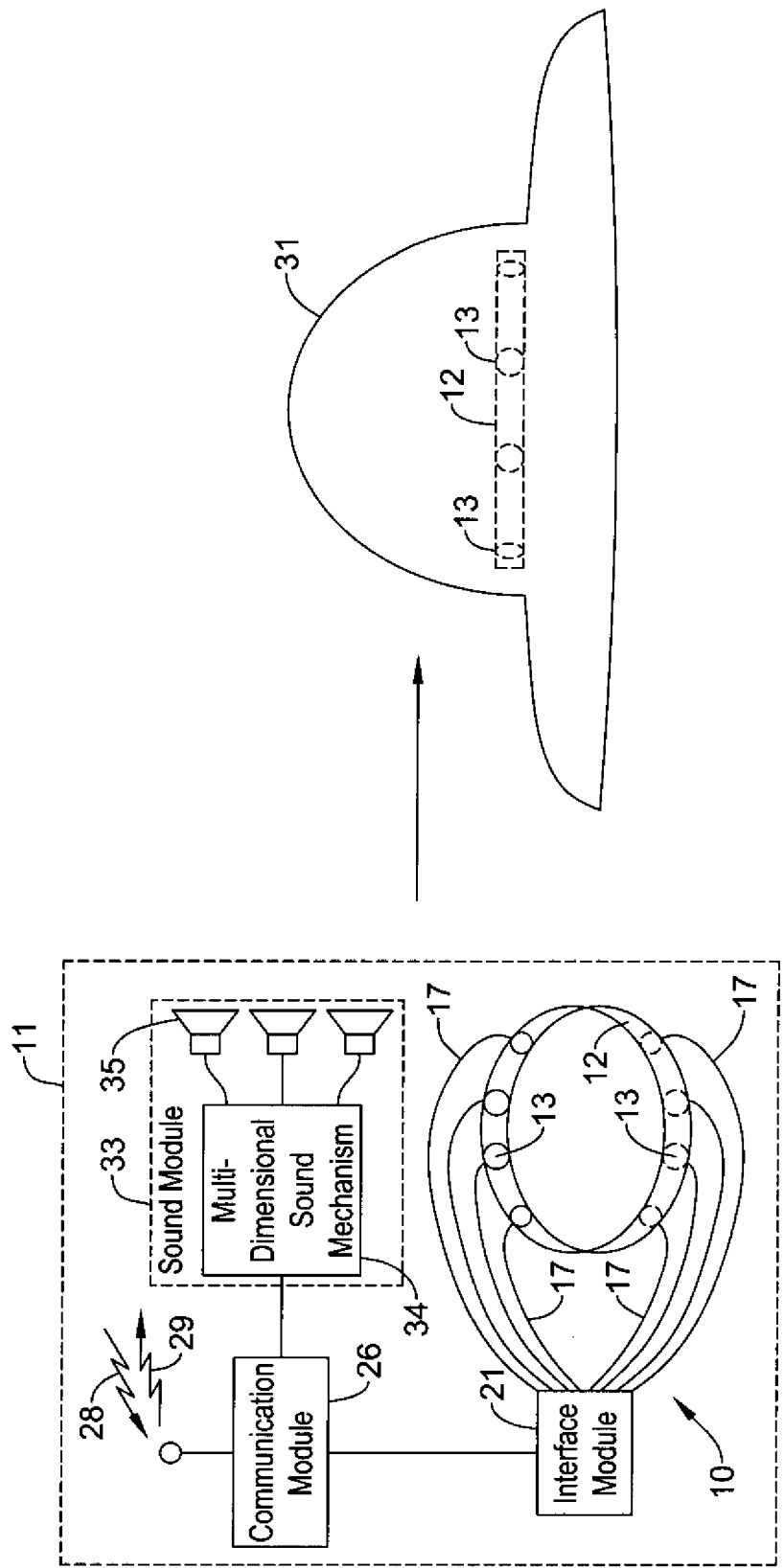
FIG. 1 is a diagram of a head-gear based tactile and sound guidance system.

Firefighters and other emergency responders, military personnel, construction workers, miners, or anyone requiring a hard hat or helmet, may need information on location and direction of themselves or other members of their team while in the field. Not only is directional information provided to find another person but emergency and alarm information where direction and distance is important may be provided. For instance, a helmet may give alarm signals to the wearer if that person gets too close to a ledge at a construction site or is standing in the way of a construction vehicle that does not see the person.

Some technologies may exist for determining the position of people in a building, or notifying someone of emergencies or critical conditions. However, displaying this information to an individual may be difficult. Visual and auditory displays may have multiple problems and have not necessarily been accepted by users. Visual displays may require either a hand held device or need to be mounted to a visor and may be obscured by moisture caused by condensation, especially for firefighters. They may also occlude part of the user's normal visual field. 3D auditory displays may suffer from front/back confusion that can be difficult to resolve or they may interfere with the user's ability to hear environmental sounds. Another display is needed that does not suffer from these issues.

The present invention may use a tactile display in either stand-alone mode or in conjunction with an auditory display. In standalone mode, tactors in the helmet headband may use a vibrating element to indicate the direction and distance to a target of interest. Also the identity of the person or target may be encoded as a unique vibration pattern or signature. In a hybrid mode, an auditory display may give a target name, and use 3D audio to give some indication of direction. The tactile display may give either a redundant directional cue or be used to remove the front/back confusion inherent to a headset-based 3D audio system. On the other hand, tactile may be better in indicating direction but audio can provide much more information as to relative altitude (up/down) and also identification of the object/person to which one is getting the distance/direction (e.g., ringtone).

When one says "3D audio", it may mean "directionalized" or "spatialized" audio tones or speech. "Spatialized" audio in the form of speech might be more effective than pure audio tones for giving bearing information. The term may be derived from the redundancy provided by spoken words ("go left 45 degrees") emanating from a perceived direction of left 45 degrees. Another item is that 3D audio may use just one transducer. For the one transducer, the 3D effect may be created artificially in software through a model of the human ear. The modulated sound may then sent out over the headphone.

A strictly tactile system may be noted. Tactors, vibrating elements similar to those used in cell-phones, may be mounted in the headband of a user's hat, helmet or protective hood. An array of eight tactors, more or less, may be connected to a D/A board that receives commands from an embedded processor that interfaces to a location/tracking sensor system.

Automatically, or at a user's selection, the system may provide a tactile indication which conveys information to a person such as direction, bearing, identity, movement, orientation, targets, routes, destinations, and other information. For instance, tactile patterns may provide identification of a target. The target may be a specific person, multiple exits from a dark chamber, landmarks, or other items. The system may also provide a tactile indication of the direction and distance of each target of interest. Multiple targets may require the directions to be indicated in a D/A series to prevent confusion.

A hybrid tactile multi-dimensional (e.g., 3D) audio system may be noted. In an illustrative example, two tactors may be used in the headband, at the front and back of the helmet. When the 3D audio system is triggered, the appropriate tactor may be turned on so as to give the user a better sense of front-back orientation of the 3D audio signal. The tactor signal may occur at any time from before the onset of 3D audio to any time during the 3D signal. The tactors may be driven in much the same manner as in the tactile only system.

To provide 3D audio, one may need only one audio transducer. That is, the 3D effect may be created artificially by a model of a human so that the 3D audio is actually simulated rather than being real.

Automatically, or at user selection, the system may provide a multi-dimensional, e.g., 3D, audio indication which conveys information to a person such as direction, bearing, identification, movement, orientation, targets, routes, destinations, landmarks, and other information. For instance, audio patterns may provide identification of a target. The target may be, for example, a specific person, multiple exits from a dark chamber, or other items. The system may also provide an audio indication of the direction and distance of each target of interest.

In both systems, in addition to direction and distance, other information as indicated herein may be displayed to the user. For example, a tactile or audio signal might indicate direction to a fallen firefighter. This might be in the form of an audio icon, earcon, synthetic speech, or a vibration pattern. In another approach, a tactile or audio signal might give an indication of an alarm where the alarm indicates a dangerous situation together with the direction to the danger such as a piece of equipment or ledge that may result in a fall.

FIG. 1 is a diagram of an illustrative example of a tactile guidance system 10. In symbol 11 is the system 10 as it may exist when placed on a person, such as a firefighter or other person needing navigational guidance when in limited visibility situations. Guidance may be effected on a person with tactile impressions, such as vibration, placed on the flesh or skin of the person. In the present example, the impressions may be made about the head of the person.

Figure 2:
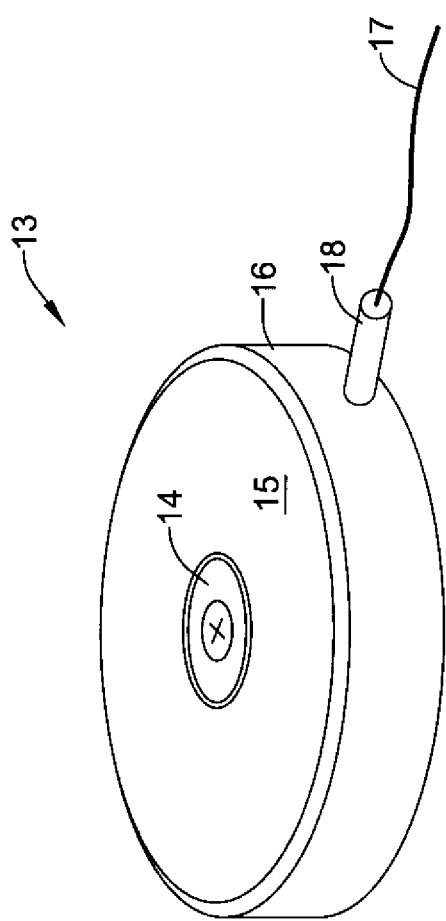
FIG. 2 is a diagram of a tactor.

There may be a head mount or other structure 12 which holds one or more tactors 13. A tactor 13 may be a miniature vibrotactile transducer which is designed to provide a strong localized sensation on the body of a person. The tactor 13 may be a linear actuator which incorporates a moving contactor that is lightly preloaded against the skin. When an electrical signal is provided to the tactor 13, the contactor 14 may oscillate perpendicular to the skin, while the surrounding skin area is shielded with a passive housing 15 (see FIG. 2). The actuator for contactor 14 may be enclosed in a case 16. An electrical signal for excitation of the actuator may be provided via a flexible wire 17. Wire 17 may be supported with a strength member 18 mounted securely to case 16. A tactor 16, as an example, may be available from Engineering Acoustics, Inc., in Casselberry, Fla. Other kinds of tactors may be used in the present system and be available from various vendors.

Figure 3:
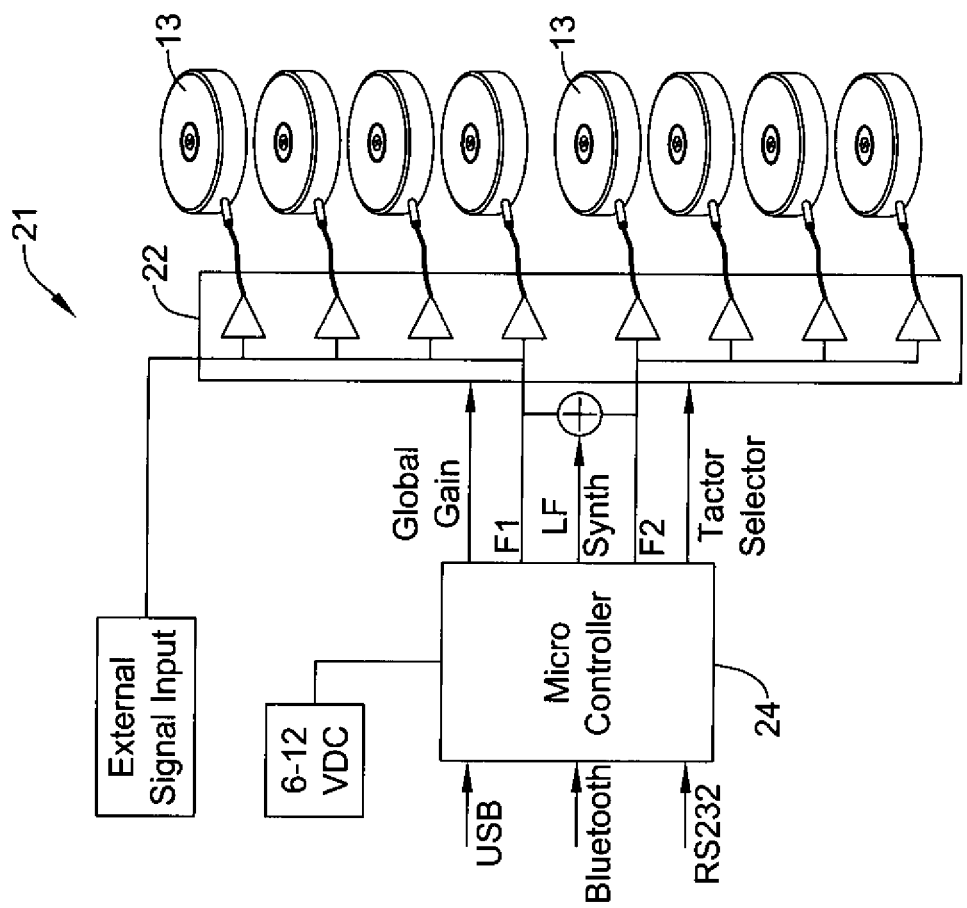
FIG. 3 is a diagram of an illustrative interface circuit for tactors.

As shown in FIG. 3, tactors 13 may be driven by an interface module 21. Module 21 may include driver circuitry 22 connected to tactors 13, and a microcontroller 24, if desired, connected to the driver circuitry 22. Examples of a tactor interface module or circuitry 21 may also be available from Engineering Acoustics, Inc., and other places. On the other hand, circuitry 21 may be custom designed by a producer of system 10.

One or more receiver/transmitter units in communication module 26 may provide signals for tactors 13 from an external station 27 (see FIG. 5) via radio frequency (RF) radiation 28. Information may be provided to station 27 by transmitters in communication module 26. Such information may include several RF radiation 29 transmissions from two transmitters, respectively. The transmitters may be separated by a certain distance such that their transmissions provide a basis for triangularization by station 27 so that a location of system 10 or structure 12 may be determined. Also, orientation or direction of system 10 or structure 12 may be determined by station 27.

Structure 12 along with tactors 13 attached to structure 12 may be placed in a helmet or hat 31. Structure 12 may be attached to hat 31. When a person 32 puts on hat 31, the tactors 13 may come into contact with the person's head. Structure 12 may need to be adjusted for a particular person so that tactors 13 are in appropriate contact with the surface of the person's head. The number of tactors 13 on structure 12 may vary. The present approach shows eight tactors but the number of tactors selected may range from one to more than eight.

The interface module 21 and communication module 26 may be situated inside of hat 31. Also, there may be a multi-dimensional sound module 33 associated with system 10. Module 33 may be optional and in many tactor 13 approaches, module 33 is not necessarily present. If module 33 is present, then it may provide 3-D or surround sound to indicate a direction to the person 32 wearing a hat 31 equipped with mechanism 33. In this version, structure 12 may have just one or two tactors 13 for disambiguating the sound signal so that person 32 may perceive the appropriate one of two different directions indicated by the sound. The correct direction of the sound may be indicated to person 32 by a tactor 13 sensation signal. Sound transducers 35 connected to a mechanism 34 may be situated in the vicinity of the ears of person 32. The sound transducers 35 may be speakers, earphones, bone conduction devices, or the like. Earphones over or in the ears may not be permitted or desired in some applications of the present approach. For instance, a fireperson might not be allowed to wear anything that obscures his or her hearing of the ambient environment.

FIG. 4 is a diagram of person 32 with a tactor 13 situated on his forehead. Tactor 13 may be held in place with structure 12 as described in FIG. 1. There may be more tactors 13 situated at various places about the person's head.

FIG. 5 is a diagram of person 32 wearing hat 31 with components shown in symbol 11 situated within hat 31. Communication module 26 within hat 31 may communicate with station 27 via RF signals 28 and 29 being received from and transmitted to station 27, respectively, to provide geographical directions, bearing, distance and direction of movement for going to certain objects or targets.

Communication module 26 may have direction-finding electronics which can provide geographical directions, the bearing of the person's face, movement information, and so on, to person 32 via tactors 13 and/or the multi-dimensional sound module 33, without RF contact with station 27. Communication module 33 may determine such information with its internal electronics such as magnetic sensors, gyros, accelerometers, and the like. On the other hand, communication module 33 may obtain such information from an internally installed GPS system or other location reckoning system.

There may be several locating approaches; one that covers a built-in RF location/orientation device that could use one of several RF location technologies that include angle-of-arrival, time of flight or signal strength. Other sensors might be used here to detect the relative direction to a dangerous situation such as being in the way of a moving vehicle or approaching a cliff. Another approach may describe the direction and orientation information that is provided from an external source over an RF link.

There may be two or more frequency transmitters and one or more radio frequency receivers associated with a helmet worn by some person. A station at another location may determine a direction, location and/or movement of the helmet from signals emitted by the two or more radio frequency transmitters. The station may provide signals for reception by the one or more radio frequency receivers. The one or more frequency receivers may provide the signals to a signal source. The signal source may provide perceptible information to the one or more tactors. Such information may incorporate directions to safety, to a person in need of rescue, and so on.

There may be an electronic positioning system in a helmet, for providing location, direction and movement information of the person wearing the helmet. The positioning system may provide signals to tactors in the helmet. The person wearing the helmet may receive tactile signals from the tactors indicating the location, directional and/or movement information including increasing or decreasing distance from a designated location such as a place of danger. Such information may be accompanied by a danger warning to the person approaching such place. The place may instead be a location of a person in need of help or rescue.

With sound module 33, if incorporated in system 10, station 27 may communicate messages to and receive messages from person 32 under certain circumstances. In other circumstances, tactile communication via tactors 13 may be the only reasonable way for person 32 to receive information, such as for personal navigation. Up-and-down movement and various body orientations may be communicated to person 32 from station 27. Orientation information may be particularly useful to a diver in opaque water or a pilot flying via VFR (visual flight rules) suddenly caught in a massive cloud.

Relevant patent documents may incorporate: U.S. Pat. No. 7,420,510 B2, issued Sep. 2, 2008, and entitled "Location and tracking of People with Combined Use of RF Infrastructure and Dead Reckoning Modules", which is incorporated herein by reference; U.S. Pat. No. 7,545,263 B2, issued Jun. 9, 2009, and entitled "Audio-Based Presentation System", which is incorporated herein by reference; and U.S. Patent Application Pub. No. 2007/0201421 A1, published Aug. 30, 2007, and entitled "Method and Apparatus for Location Estimation", which is incorporated herein by reference.

In the present specification, some of the matter may be of a hypothetical or prophetic nature although stated in another manner or tense.

Although the present system has been described with respect to at least one illustrative example, many variations and modifications will become apparent to those skilled in the art upon reading the specification. It is therefore the intention that the appended claims be interpreted as broadly as possible in view of the prior art to include all such variations and modifications.

What is claimed is:

1. A guidance system comprising:
   a head mount;
   one or more audio transducers attached to the head mount that provide 3D audio;
   one or more tactors attached to the head mount; and
   an electronics module connected to the one or more tactors and the one or more audio transducers; and
   wherein:
   the one or more tactors are positioned in the head mount so as to make physical contact with a person's head substantially about a circumference disposed above eyes and ears of the person's head when the head mount is situated on the person's head;
   the 3D audio exhibits front/back confusion; and
   the electronics module provides signals to the one or more tactors to indicate a direction that removes the front/back confusion for the person.

2. The system of claim 1, wherein the electronics module is attached to the head mount.

3. The system of claim 1, wherein:
   the direction is for telling the person where to go or what direction the person is facing; and
   the signals to the one or more tactors tell the person whether the person is moving closer to or farther from a destination.

4. The system of claim 1, wherein:
   the electronics module comprises a direction sensor; and
   the direction sensor provides signals to the one or more tactors for telling the person a direction that the person is facing.

5. The system of claim 1, wherein the electronics module reconfigures a pattern of signals provided to the one or more tactors in an event that one or more tactors fail.

6. The system of claim 1, wherein:
   a tactor of the one or more tactors provides signals to a person via physical contact of the tactor at a place on a head of the person;
   the signals from the tactor provide a physical stimulation at the place on the head; and
   the signals have variable amplitudes, frequencies, rhythms, codes, and/or patterns sufficient to identify a target.

7. The system of claim 1, wherein the one or more tactors provide to a person wearing the head mount indications of air supply status, ambient temperature, up and down movement, impending danger messages, and/or other items.

8. The system of claim 1, wherein the head mount is integrated as part of headgear.

9. The system of claim 1, wherein the one or more audio transducers provide signals which have variable amplitudes, frequencies, rhythms, codes, and/or patterns sufficient to identify a target.

10. The system of claim 1, wherein the 3D audio includes a directional cue conveyed with one or more spoken words.

11. A method for physical guidance of a person, comprising:
    placing a plurality of tactors in physical contact with the person about a circumference disposed above eyes and ears of the person's head;
    providing multi-dimensional audio to a person; and
    providing signals from the one or more tactors in a form of physical stimulation at one or places proximate to the person's head; and
    wherein:
    the multi-dimensional audio provides sound appearing to be from an ambiguous direction to the person hearing the sound; and
    the plurality of tactors provides disambiguation signals to resolve the ambiguous direction from the multi-dimensional audio.

12. The method of claim 11, wherein:
    the plurality of tactors are placed in a head mount; and
    the head mount is for placement on a person's head so as to place the plurality of tactors in physical contact proximate to the person's head.

13. The method of claim 11, further comprising:
    providing coded signals to the tactors so as to provide additional information to the person; and
    wherein the additional information comprises air supply status, ambient temperature, movement, orientation of the person, imminent danger, and/or other items.

14. The method of claim 11, wherein the multi-dimensional audio includes a directional cue conveyed with one or more spoken words.

15. A tactile guidance system comprising:
    a structure;
    one or more tactors attached to the structure;
    a signal source connected to the one or more tactors; and
    a multi-dimensional sound transducer attached to the structure; and
    wherein:
    the signal source is for providing direction and/or location information about the structure to the one or more tactors;
    the structure is for providing contact between the one or more tactors and a surface on a person's head;
    the sound transducer is connected to the signal source;
    the sound transducer provides a sound indicating an ambiguous direction; and
    the one or more tactors provide a tactile signal to resolve the ambiguity of the direction of the sound.

16. The system of claim 15, further comprising:
    a location/orientation device situated in the structure using an RF technology from a group consisting of angle-of arrival, time of flight and signal strength; and
    wherein:

the device can indicate distance and location relative to a dangerous situation; and the device is connected to the signal source.

17. The system of claim 15, further comprising:

a device for providing direction and orientation information provided by an external source over an RF link; and wherein the device is connected to the signal source.

18. A tactile guidance system comprising:

a head mount;

a front tactor and a back tactor attached to the head mount, the front tactor and the back tactor each positioned in the head mount so as to make physical contact with a person's head substantially in the front and the back, respectively, of the person's head, above the level of eyes and ears of the person's head;

one or more audio transducers attached to the head mount;

an electronics module connected to the front tactor, the back tactor, and the one or more audio transducers; and wherein:

the one or more audio transducers provide a sound indicating a 3D direction;

the 3D direction of the sound is ambiguous; and the front tactor and the back tactor provide a tactile signal to resolve the ambiguity of the 3D direction of the sound.

* * * * *